(12) United States Patent
Koma et al.

(10) Patent No.: US 9,463,517 B2
(45) Date of Patent: Oct. 11, 2016

(54) WORK CUTTING METHOD AND SINGLE-WIRE TYPE WIRE SAW

(71) Applicant: Komatsu NTC Ltd., Nanto, Toyama (JP)

(72) Inventors: Kikuo Koma, Imizu (JP); Tsutomu Sugihara, Nanto (JP); Akira Tanizaki, Nanto (JP); Akihiro Matsuda, Takaoka (JP)

(73) Assignee: Komatsu NTC Ltd., Nanto (JP)

( * ) Notice: Subject to any disclaimer, the term of this patent is extended or adjusted under 35 U.S.C. 154(b) by 36 days.

(21) Appl. No.: 14/661,131

(22) Filed: Mar. 18, 2015

(65) Prior Publication Data

US 2015/0266117 A1  Sep. 24, 2015

(30) Foreign Application Priority Data

Mar. 19, 2014  (JP) .................................. 2014-056140

(51) Int. Cl.
*B23D 57/00* (2006.01)
*B24B 27/06* (2006.01)

(52) U.S. Cl.
CPC ....... *B23D 57/0061* (2013.01); *B23D 57/0069* (2013.01); *B24B 27/0633* (2013.01); *Y10T 83/04* (2015.04); *Y10T 83/7101* (2015.04); *Y10T 83/7208* (2015.04)

(58) Field of Classification Search
CPC .......... B23D 57/0061; B23D 57/0069; B24B 27/0633; Y10T 83/7208; Y10T 83/7101; Y10T 83/04
USPC .......................... 83/307.1–307.3, 580, 651.1
See application file for complete search history.

(56) References Cited

U.S. PATENT DOCUMENTS

| | | | | |
|---|---|---|---|---|
| 2,831,476 A * | 4/1958 | Wilson | ................... | B28D 5/045 125/12 |
| 4,393,450 A * | 7/1983 | Jerard | ................ | B23D 57/0007 125/16.01 |
| 4,436,010 A * | 3/1984 | Valentine | ............... | B26D 7/015 30/140 |
| 4,558,420 A * | 12/1985 | Gerber | ...................... | A41H 1/02 318/568.13 |
| 4,683,791 A * | 8/1987 | Demont | ................... | B26D 5/22 83/16 |
| 4,702,138 A * | 10/1987 | Hattori | ............... | B23D 57/0007 125/16.01 |
| 4,909,108 A * | 3/1990 | Nakada | ................ | B23D 53/045 83/699.51 |
| 5,873,295 A * | 2/1999 | Hall | ................... | B23D 57/0015 30/116 |
| 6,039,830 A * | 3/2000 | Park | ......................... | B26D 3/10 156/267 |
| 6,868,765 B2 * | 3/2005 | Poetzsch | ................ | B26D 3/006 83/174 |
| 7,526,985 B2 * | 5/2009 | Tokiwa | ................ | B23D 55/005 83/13 |

(Continued)

FOREIGN PATENT DOCUMENTS

WO  2008/001816 A1  1/2008

*Primary Examiner* — Sean Michalski
(74) *Attorney, Agent, or Firm* — Sughrue Mion, PLLC

(57) ABSTRACT

In a single-wire type wire saw, a work is fed relatively to a wire stretched between a pair of grooved guide rollers disposed in the same direction and the work is cut by traveling the wire. When a cutting-feeding direction changes during a cutting of the work, an operation shaft is moved along an arc around the center axis of the wire in a cutting area and simultaneously support arms are rotated around the operation shaft to thereby oppose the wire support direction of the pair of grooved guide rollers to the cutting-feeding direction.

11 Claims, 6 Drawing Sheets

(56) References Cited

U.S. PATENT DOCUMENTS

| | | | | |
|---|---|---|---|---|
| 7,963,198 B2* | 6/2011 | Friedenbach | B26B 5/00 | 82/47 |
| 8,061,244 B2* | 11/2011 | Cooper | B22D 31/00 | 83/13 |
| 8,099,869 B2* | 1/2012 | Hess | B26B 27/002 | 30/116 |
| 8,136,434 B2* | 3/2012 | Casella | B23D 59/002 | 83/174 |
| 8,141,611 B2* | 3/2012 | Lai | B23D 49/02 | 156/701 |
| 8,171,833 B2* | 5/2012 | Felton | A01J 27/04 | 30/116 |
| 8,261,643 B2* | 9/2012 | Cosgrove | B23D 53/026 | 29/426.4 |
| 8,286,625 B2* | 10/2012 | Jenkins | B23D 57/0007 | 125/12 |
| 8,360,047 B2* | 1/2013 | Pedrini | B23D 57/0023 | 125/13.02 |
| 8,381,624 B2* | 2/2013 | Donovan | B23D 55/026 | 83/816 |
| 8,397,610 B2* | 3/2013 | Koch | B28B 11/0863 | 83/307.1 |
| 8,412,014 B2* | 4/2013 | Sato | G02B 6/4404 | 385/100 |
| 8,475,081 B2* | 7/2013 | Clark, II | B63B 35/03 | 405/156 |
| 8,534,592 B2* | 9/2013 | Payne | B26D 1/00 | 242/557 |
| 8,881,716 B2* | 11/2014 | Hoshiyama | B23D 57/0069 | 125/16.02 |
| 8,893,597 B2* | 11/2014 | Coursey | F16F 1/18 | 267/158 |
| 9,016,181 B2* | 4/2015 | Simmons | B26D 1/08 | 83/613 |
| 9,283,688 B2* | 3/2016 | Tillmann | B23D 51/16 | |
| 9,339,942 B2* | 5/2016 | Steingrueber | B26D 3/085 | |
| 2009/0320658 A1* | 12/2009 | Yazawa | B23D 57/0007 | 83/13 |
| 2011/0214543 A1* | 9/2011 | Shae | B23D 57/0007 | 83/54 |
| 2012/0048088 A1* | 3/2012 | Gambini | B26D 1/547 | 83/307.1 |
| 2013/0043218 A1* | 2/2013 | Lancaster-Larocque | B23D 57/0023 | 219/69.17 |
| 2013/0333534 A1* | 12/2013 | Votolato | B26B 27/002 | 83/13 |
| 2015/0027287 A1* | 1/2015 | Harper | B23D 57/0038 | 83/651.1 |

\* cited by examiner

WORK CUTTING METHOD AND SINGLE-WIRE TYPE WIRE SAW

CROSS-REFERENCE TO RELATED APPLICATION

This application claims priority based on Japanese Patent Application No. 2014-056140, filed on Mar. 19, 2014, the entire contents of which are incorporated by reference herein.

BACKGROUND OF THE INVENTION

1. Field

The invention relates to a method for cutting mainly a long work using a single-wire type wire saw, and an improved single-wire type wire saw for realizing such method.

2. Related Art

A single-wire type wire saw holds a linear-shaped wire between grooved guide rollers and presses a work against the wire while traveling, thereby cutting the work. Normally, the work is machined and fed at a specific position to the traveling wire by a machining/feeding device. In the cutting step, the wire supporting direction of the grooved guide roller relative to the wire must be always opposed to the work machining/feeding direction the work machining/feeding direction in order to prevent the wire from slipping-off from the grooved guide rollers, the guide grooves of the grooved guide rollers from being unsymmetrically worn, and the traveling wire from meandering.

For example, in WO2008/001816, in a single-wire type wire saw, according to the change of a work cutting direction, a pair of grooved rollers are rotated about the axis of the wire together with a roller-supporting cutting arm to shift the paired grooved rollers supporting direction relative to the wire, whereby the whole rigidity supporting direction of the paired grooved rollers relative to the wire is opposed to the work machining/feeding direction.

According to the technology of WO2008/001816, the roller-supporting cutting arm is disposed in a direction perpendicular to the roller axis of the paired grooved rollers, namely, on the extension line of the work machining/feeding direction. Thus, the length of the work capable of cutting is restricted by the length of the roller-supporting cutting arm. This restriction can be solved by extending the length of the arm. However, in this solution, when the required support rigidity of a mechanical element is secured, the size of the cutting apparatus must be increased, which is not practical.

SUMMARY OF THE INVENTION

According to the invention, in a step where a work is disposed opposed to a wire between a pair of grooved guide rollers, the work is cutting-fed relatively to the wire and the work is cut by traveling the wire, the respective roller shafts of the paired grooved guide rollers are connected to their respective support arms, the support arms are rotatably supported by a movable operation shaft extending parallel to the wire, when the cutting-feeding direction changes during a cutting of the work, the operation shaft is moved along an arc around the center axis of the wire in the cutting area and simultaneously the support arms are rotated around the operation shaft to thereby oppose the wire support direction of the guide rollers to the cutting-feeding direction.

More specifically, the invention is a method for cutting a work using a single-wire type wire saw. The single-wire type wire saw includes a pair of grooved guide rollers. The pair of grooved guide rollers are rotatably contacted externally with a wire stretched with predetermined tension by respective roller shafts of the pair of grooved guide rollers with the same direction. A work is placed in a cutting area between the pair of grooved guide rollers, with a cutting-feeding direction previously set in a direction opposed to a wire support direction of the pair of grooved guide rollers. The work is fed in the cutting-feeding direction relatively to the wire to press a cutting position of the work against the wire. The work is cut along a cutting line by traveling the wire. The cutting method including: holding the wire at the cutting position of the work by supports arms and a movable operation shaft, the support arms connecting to the roller shafts respectively and extending in a direction of the roller shafts, and the movable operation shaft supporting the support arms rotatably and a shaft of the operation shaft being parallel to a center axis of the wire, moving the operation shaft along an arc around the center axis of the wire in the cutting area, when the cutting-feeding direction changes during a cutting of the work; and rotating the support arms around the operation shaft simultaneously with the moving of the operation shaft to thereby oppose the wire support direction of the pair of grooved guide rollers to the cutting-feeding direction.

Also, according to the invention, in the above cutting method using a single-wire type wire saw, during a changing of the cutting-feeding direction, when an actual cutting position is retreated from a target cutting position by a distance outside of an allowable range due to deflection of the wire in the cutting area, the cutting of the work is continued in excess by the distance to make the actual cutting position coincide with the target cutting position, whereby the wire support direction of the pair of grooved guide rollers is made opposed to the cutting-feeding direction.

Further, according to the invention, in the above cutting method using a single-wire type wire saw, the operation shaft includes a hold unit, and during the cutting of the work, the wire is held at the cutting position of the work by a hold force of the hold unit. Also, the operation shaft is positioned in two mutually directions orthogonal to a position of the operation shaft, on a plane orthogonal to the operation shaft, to thereby move the operation shaft along the arc around the center axis of the wire.

According to another aspect of the invention, a single-wire type wire saw includes a pair of grooved guide rollers. The pair of grooved guide rollers are rotatably contacted externally with a wire stretched with predetermined tension by respective roller shafts of the pair of grooved guide rollers with the same direction. A work is placed in a cutting area between the pair of grooved guide rollers, with a cutting-feeding direction previously set in a direction opposed to a wire support direction of the pair of grooved guide rollers. The work is fed in the cutting-feeding direction relatively to the wire to press a cutting position of the work against the wire, and the work is cut along a cutting line by traveling the wire. The wire saw includes support arms, a movable operation shaft, a hold unit, a positioning drive device, a positioning control device. The support arms connect to the roller shafts respectively and extend in a direction of the roller shafts. The movable operation shaft supports the support arms rotatably. A shaft of the operation shaft is parallel to a center axis of the wire. The hold unit holds the wire at the cutting position of the work. The positioning drive device positions the operation shaft in two mutually directions orthogonal to a position of the operation shaft, on a plane orthogonal to the operation shaft. The positioning control device drives the positioning drive device in the two mutually orthogonal directions according to data of the cutting line of the work to thereby move the operation shaft. When the cutting-feeding direction changes during a cutting of the work, the operation shaft is moved along an arc around the center axis of the wire in the cutting area by the positioning control device and the positioning drive device, and simultaneously the support arms are rotated around the operation shaft by the positioning control device and the hold unit to thereby oppose the wire support direction of the pair of grooved guide rollers oppose to the cutting-feeding direction.

In the single-wire type wire saw of the invention, when the positioning control device determines that, during a changing of the cutting-feeding direction, when the positioning control device determines that an actual cutting position is retreated from a target cutting position by a distance outside of an allowable range due to deflection of the wire in the cutting area, the cutting of the work is continued in excess by the distance to make the actual cutting position coincide with the target cutting position, whereby the wire support direction of the pair of grooved guide rollers is made opposed to the cutting-feeding direction.

In the above single-wire type wire saw of the invention, the operation shaft includes the hold unit, and during the cutting of the work, the wire is held at the cutting position of the work by a hold force of the hold unit. Also, the hold unit includes a torque motor or a servo motor. Further, the wire is disposed at a predetermined position and the work is moved in the cutting-feeding direction.

Moreover, the work is fixed on a cutting-feeding table, and the cutting-feeding table is cutting-fed in two orthogonal directions by two cutting-feeding units according to data of the cutting line of the work. Further, another pair of grooved guide rollers are disposed opposed to the pair of grooved guide rollers, and both of the pair of guide rollers are contacted externally with the wire to thereby support the wire in two directions.

DETAILED DESCRIPTION OF THE INVENTION

Figure 1:
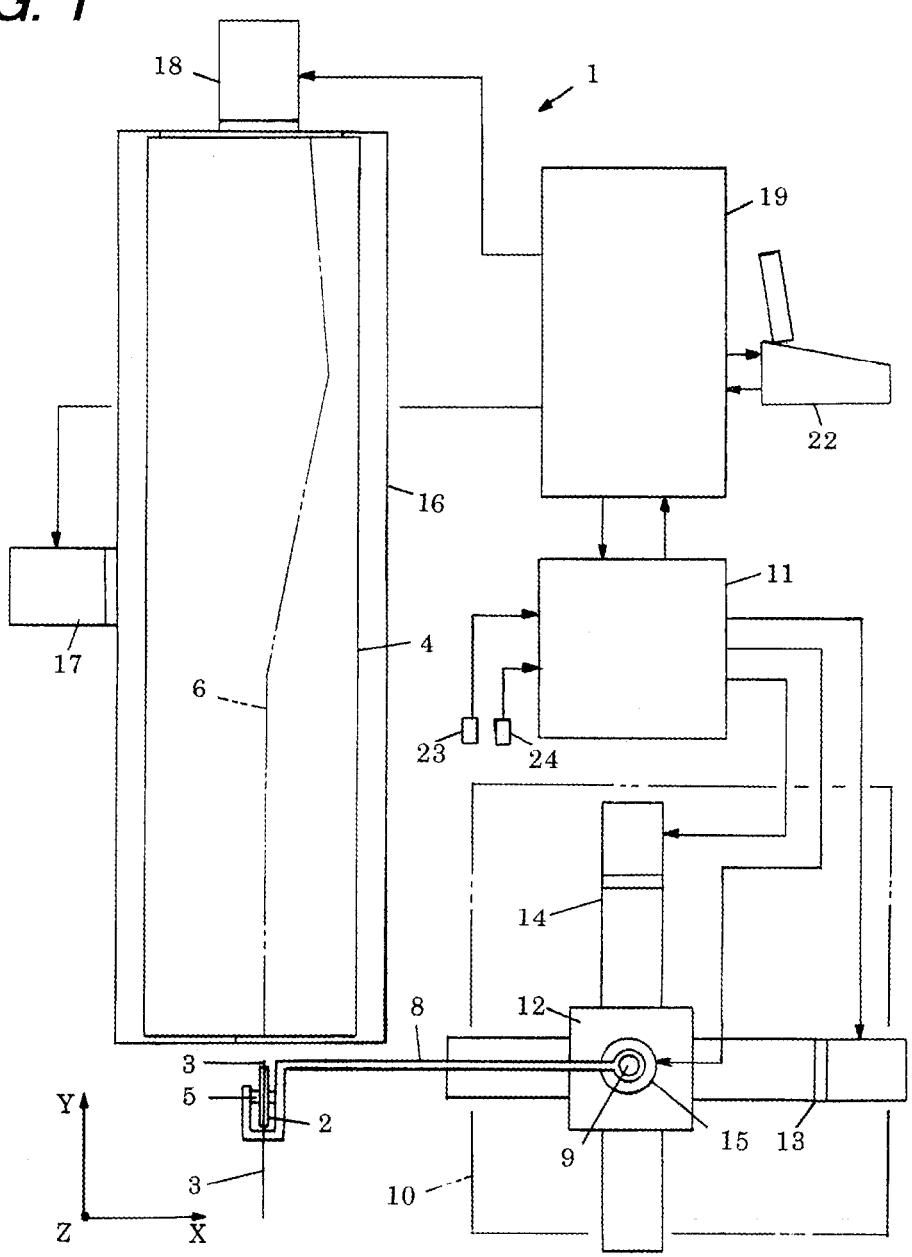
FIG. 1 is a plan view of a single-wire type wire saw of the invention.
Figure 2:
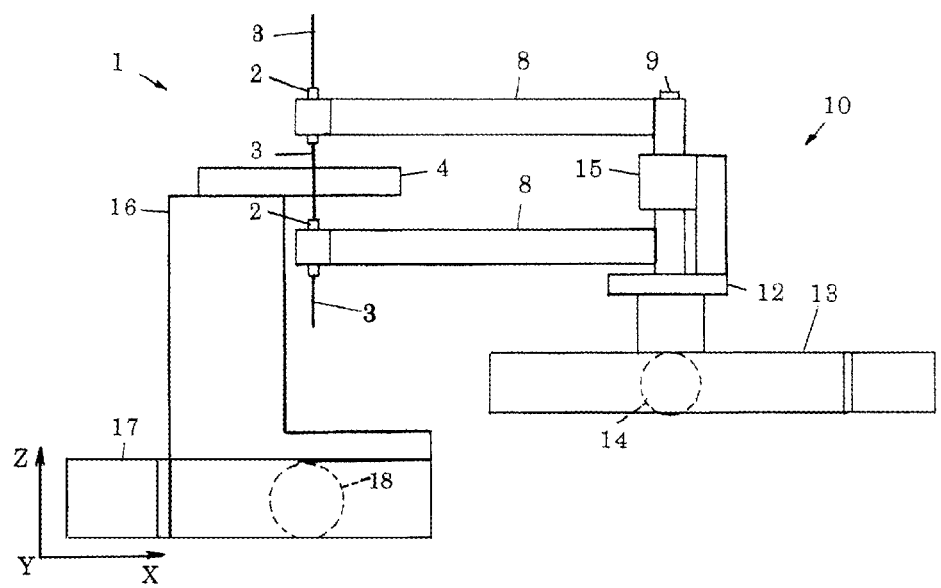
FIG. 2 is a front view of the single-wire type wire saw of the invention.
Figure 3:
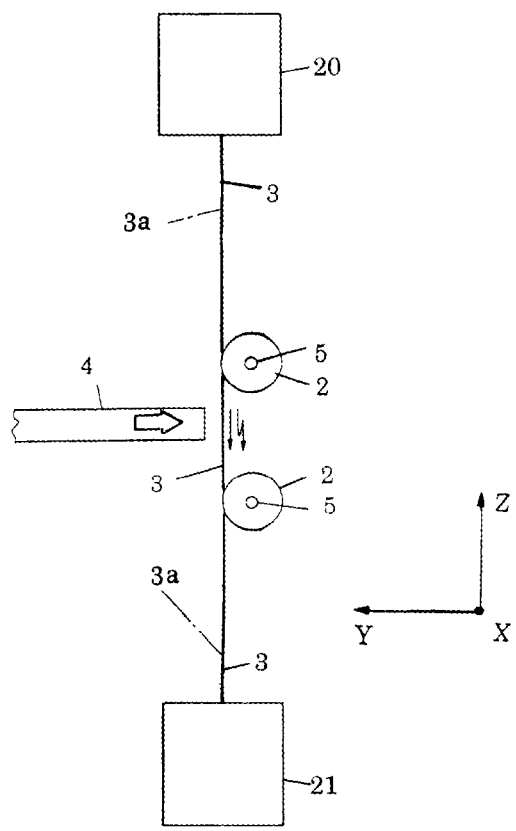
FIG. 3 is a side view of a wire path in the single-wire type wire saw of the invention.

FIGS. 1 to 4 show a specific structure example of a single-wire type wire saw 1 according to a cutting method of the invention. In the single-wire type wire saw 1, as shown in FIGS. 1 to 3, a pair of upper and lower grooved guide rollers 2 directed in the same direction are rotatably connected by their respective roller shafts 5 externally to, for example, a wire 3 stretched with specific tension at upper and lower positions in the Z direction, a work is disposed opposed to the wire 3 existing in a cutting area between the guide rollers 2, the work 4 is cutting-fed to the wire 3 in a cutting-feeding direction, the cutting position of the work 4 is pressed against the wire 3, and the work 4 is cut along a cutting line 6 by traveling the wire 3.

Figure 4:
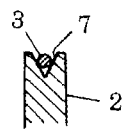
FIG. 4 is an enlarged section view of the guide groove portion of a grooved guide roller.

Since the roller shafts 5 of the guide rollers 2 are parallel to each other, the respective guide rollers 5 are rotatably supported in the same direction and, as shown in FIG. 4, the wire 3 is stored within an externally peripheral guide groove 7. The directions of the two guide rollers 2 may preferably be coincident with each other but they may also be different slightly so long as such difference not raise any trouble practically, for example, so long as the wire 3 is prevented from slipping off from inside the guide groove 7 and, while traveling, it is prevented against meandering.

The wire support directions of the guide rollers 2 are their radial directions in their external contact points by the wire 3, while the radial directions coincide with the whole rigidity support direction by the guide rollers 2. Thus, the wire support directions of the guide rollers 2 are set so as to perfectly coincide with the whole rigidity support direction, or to be within a practically allowable range around the whole rigidity support direction. Also, the cutting-feeding direction of the work 4 is parallel to the wire support direction of the guide rollers 2 and is opposed to the wire support direction.

The wire 3 may preferably be a fixed abrasive type wire but, depending on the material of the work 4, may also be a loose abrasive type wire, while it is opposed to the cutting position of the work 4 in a cutting area between the guide rollers 2. The work 4 is a long rectangular plate made of, for example, carbon fiber reinforced resin material or glass fiber reinforced resin material and, normally, is cutting-fed in a cutting-feeding direction on a plane orthogonal to the wire 3. Here, for obliquely cutting, the work 4 is cutting-fed inclined relative to the wire 3.

The wire 3, as in the wire path of FIG. 3, is fed out from a wire feed-out device 20, is contacted externally with the guide rollers 2, is continuously traveled in one direction or is reciprocatingly traveled with tension suitable for the cutting of the work 4 in the cutting area between the guide rollers 2, and is then taken up onto a wire take-up device 21. Thus, the wire 3 extends linearly between the wire feed-out device 20 and wire take-up device 21 and is contacted externally with the guide rollers 2 under proper tension.

The wire feed-out device 20 and wire take-up device 21, although not shown, drive the wire 3 to travel continuously in one direction or reciprocatingly to thereby supply it from the wire feed-out side to the wire take-up side, while maintaining the tension of the wire 3 at a value proper for cutting. In the illustrated example, the wire feed-out device 20 and wire take-up device 21 are immovably disposed at a specific position.

And, the single wire type wire saw 1 of the invention includes, as the characteristic composing elements thereof, a support arm 8 connected to the roller shafts 5 of the guide rollers 2 and extending in the direction of the roller shafts 5, a movable operation shaft 9 supporting the support arm and extending parallel to the center axis 3a of the wire 3 in the cutting area, a positioning drive device 10 for moving the operation shaft 9 from two directions on a plane orthogonal to the operation shaft 9, specifically, in the illustrated example, from X and Y directions on the XY plane to position the operation shaft 9, and a positioning control unit 11, according to data about the cutting line 6 of the work 4, for driving the positioning drive device 10 from the two directions, namely, X and Y directions.

While the support arms 8 are connected to their respective roller shafts 5, from the view point of simplification of control, they are situated on the lateral side where the extension of the arm center line is orthogonal to the center shaft 3a of the wire 3 in the cutting area. Therefore, in a cutting preparatory state shown in FIG. 1, the operation shaft 9 extends parallel to the center shaft 3a of the wire 3, is mounted on the positioning table 12 of the positioning drive device 10 and supports the support arms 8 to be rotatable around the operation shaft 8. Here, in the illustrated example, the operation shaft 9 side end portions of the two support arms 8 are connected integrally to operation shaft 9 and the support arms 8 are rotatably supported by the operation shaft 9, while the operation shaft 9 is a single shaft used in common with the two support arms 8. However, two shafts may also be provided individually for the respective two support arms 8.

The positioning drive device 10, in order to position the positioning table 12 in two directions, namely, in the X and Y directions, includes a positioning part 13 constituted of an X-direction feed screw unit/drive motor and a positioning part 14 constituted of a Y-direction feed screw unit/drive motor. The control unit 11 drives the parts 13 and 14 according to data about the cutting line 6 of the work 4 to move the operation shaft 9 in the X and Y directions, thereby positioning the operation shaft 9 on the XY plane.

The positioning drive device 10 also includes a hold part 15 constituted of a torque motor or a servo motor. The hold part 15, when cutting the work 4, applies to the support arms 8 a rotational force in a direction opposed to the cutting resistance of the wire 3 in the cutting area, that is, in a direction opposed to the cutting-feeding direction of the work 4, and holds this rotational force as a hold force for holding the wire 3 in the cutting area at the cutting position of the work 4.

An instruction to the torque motor serving as the hold part 15 is a torque instruction which, when cutting the work 4, corresponds to a rotational force necessary to hold the wire 3 at the cutting position of the work 4. Also, an instruction to the servo motor serving as the hold part 15 is a rotation instruction corresponding to a rotation angle necessary to hold the wire 3 at the cutting position of the work 4. The rotation force of the torque motor or servo motor, when cutting the work 4, acts as a force for holding the wire 3 at the cutting position of the work 4. The rotation force of the torque motor or servo motor can be electrically controlled simply by the control device 11 according to the inherent cutting resistance of the work 4.

The work 4, as described above, for example, is a long plate-shaped member to be cutting-fed to the wire 3 at a specific position along the cutting line 6. The cutting line 6 may be set as a curved line, a straight line, or a line constituted of these lines combined, for example, a polygonal line. For cutting-feeding, the work 4 is placed on a cutting-feeding table 16 and is fixed by a clamp (not shown). The cutting-feeding table 16 includes an X-direction cutting-feeding part 17 and a Y-direction cutting-feeding part 18. Here, the table 16 has a shape not interfering with the paired grooved guide rollers 2 and wire 3 in the process of the cutting operation along the cutting line 6 and, normally, for vertical cutting, it is disposed as a plane perpendicular to the wire 3 and, for oblique cutting, is disposed inclined relative to the wire 3.

A cutting-feeding control unit 19 incorporates therein, for example, a cutting program for NC control and, according to data about the feeding amount of the cutting line 6, drives the X-direction and Y-direction cutting-feeding parts 17 and 18 to move the cutting-feeding table 16 in the X direction, Y direction, or in the XY combined direction, whereby the cutting line 6 of the work 4 is pressed sequentially against the wire 3 in the cutting area to thereby feed the work 4 for cutting. Cutting programs and data about the feeding amounts of the cutting line 6 of the work 4 are input from a display-equipped input device 22 by the operation of an operator and, after input to the control unit 19, they are also fed to the positioning control device 11. The control device 11 transmits and receives instructions and data to and from the control unit 19 and also inputs the output signals of sensors 23 and 24. The sensors 23 and 24 are used to correspond to the deflection of the wire 3 in the cutting area and the operations and operation effects thereof are described later together with FIGS. 7 and 8.

Figure 5:
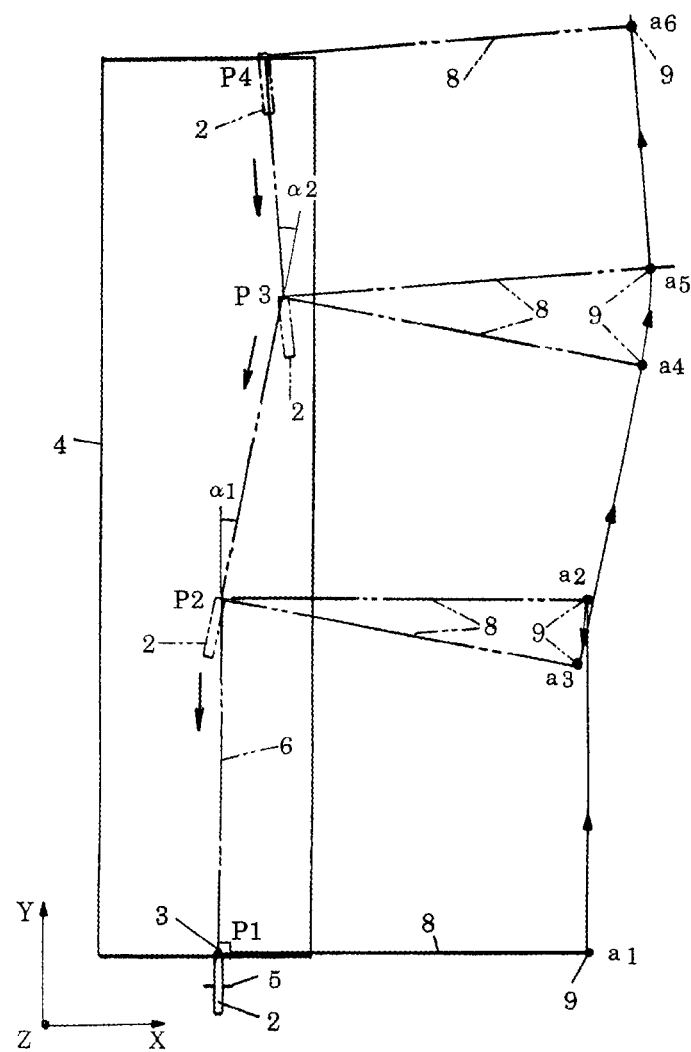
FIG. 5 is a plan view of a cutting operation to be executed by the single-wire type wire saw of the invention.

FIG. 5 shows an operation to cut the work 4 along the cutting line 6 using the single-wire type wire saw 1. When cutting the work 4, an operator operates the display-equipped input device 22 and, according to the cutting program, inputs into the control device 19 data about the feeding amounts of the cutting line 6 in the X and Y directions, the cutting-feeding speed thereof and the like. The control device 19, according to such data, creates data necessary for feeding the work 4 and data necessary for positioning of the operation shaft 9, and transmits the positioning data of the operation shaft 9 and data for driving the hold part 15 to the control device 11.

Before starting the cutting operation, the wire support direction of the guide rollers 2 is set parallel to the cutting line 6 in a section P1-P2, and the wire 3 is set at the cutting start position in the section P1-P2, that is, in contact with the point P1. Thus, the roller shafts 5 and support arms 8 are set orthogonal to the cutting line 6 in a section P1-P2 in plane view.

After such settings, the operator operates the display-equipped input device 22 to apply a cutting start instruction to the control device 19. The control device 19, on receiving the cutting start instruction, drives the cutting-feeding parts 17 and 18 according to the cutting-feeding amount data to feed the work 4 in the cutting line 6 direction, that is, in the cutting-feeding direction. With the illustrated example, in the cutting early section P1-P2, the wire 3 exists at the cutting start position point 1 in the section P1-P2 and the cutting line 6 does not vary in the X direction but is parallel to the Y direction. Thus, the control device 19 drives only the Y-direction feeding part 18 to feed the work 4 along the Y direction.

Meanwhile, the positioning control device 11 receives the operation shaft 9 positioning data from the control device 19, drives the X-direction and Y-direction positioning parts 13 and 14 as required, sets the roller shafts 5 orthogonal to the cutting line 6 and makes the wire support direction of the guide rollers 5 coincide with the direction of the cutting line 6.

With the illustrated example, in a stage before start of cutting, the wire support direction of the guide rollers 2 is set parallel to the cutting line 6 in the section P1-P2. Thus, in the step of cutting the work along the cutting line 6 in the section P1-P2, the positioning control device 11 drives neither the X-direction positioning part 13 nor Y-direction positioning part 14 but holds the operation shaft 9 at a position before start of cutting, and, with cutting-feeding of the work 4, moves the operation shaft 9 from the point a1 to the point a2 relatively. As a result, the support arm 8, in plane view, while maintaining its orthogonal state to the cutting line 6 in the section P1-P2, moves parallel to the section P1-P2.

In this manner, as the work 4 is fed along the cutting line 6, the traveling wire 3 cuts the work 4 at the required feeding speed along the cutting line 6 in the section P1-P2. While the work 4 is being cut, the control device 11 drives the hold part 15 according to driving data to apply a hold force to the support arm 8, thereby holding the wire 3 at the cutting position of the work 4 to resist the cutting resistance of the work 4. Thus, even when the cutting resistance of the work 4 is given, the wire 3 is hardly moved back in the cutting direction due to its tension and the holding force of the support arm 8, maintains its external contact position with the guide rollers and, in the cutting area, keeps cutting the work 4 along the cutting line 6 in the section P1-P2.

In this manner, the guide rollers 2 oppose the wire support direction to the cutting-feeding direction of the work 4, support the wire 3 properly within the guide groove 7, and guide the traveling of the wire 3 by the passive rotation caused by the traveling of the wire 3.

While cutting the work along the cutting line 6 in the section P1-P2, when the wire 3 reaches the point P2 in the cutting line 6, the cutting-feeding control device 19, according to data about the cutting-feeding amount of the cutting line 6 of the work 4, drives the X-direction and Y-direction feeding parts 17 and 18 simultaneously, and feeds the work 4 along the cutting line 6 in a section P2-P3 at a specific feed speed in the XY combined direction.

During the cutting line 6 in the section P2-P3, the guide rollers 2 must change their direction by an amount corresponding to the angle of a deflection angle α1 at the point 2, namely, an angle between the extension of the cutting line 6 in the section P1-P2 and the cutting line 6 in the section P2-P3 to set the roller shafts 5 of the guide rollers 2 orthogonal to the cutting line 6 in the section P2-P3, thereby opposing the wire support direction of the guide rollers 2 to the cutting-feeding direction, namely, the direction of the cutting line 6 in the section P2-P3.

Thus, the control device 11, in the change of the feeding direction of the work 4, according to data about the feeding amount of the cutting line 6 of the work 4, drives the X-direction and Y-direction positioning parts 13 and 14 of the positioning drive device 10 simultaneously to position the positioning table 12 sequentially to thereby move the operation shaft 9 clockwise by a deflection angle α1 about the center axis 3a of the wire 3 in the cutting area along an arc section a2-a3 corresponding to the deflection angle α1; and also, it drives the hold part 15 to rotate the support arm 8 about the operation shaft 9, whereby, while maintaining the contact between the guide rollers 2 and wire 3, the wire support direction of the guide rollers 2 is opposed to the cutting-feeding direction of the work 4.

At this time, the rotation angle of the operation shaft 9 is equal to the deflection angle α1. Thus, in the case that the hold part 15 is a servo motor, while the cutting-feeding direction of the work 4 is changing, the control device 11 gives to the servo motor an instruction for clockwise rotation corresponding to the deflection angle α1 to rotate the support arms 8 about the operation shaft 9, whereby, while maintaining the contact between the guide rollers 2 and wire 3, the wire support direction of the guide rollers 2 is opposed to the cutting-feeding direction of the work 4. Also, in the case that the hold part 15 is a torque motor, while the cutting-feeding direction of the work 4 is changing, the control device 11 gives the torque motor a torque instruction corresponding to a required rotation force to rotate the support arms 8 about the operation shaft 9, whereby, while maintaining the contact between the guide rollers 2 and wire 3, the wire support direction of the guide rollers 2 is opposed to the cutting-feeding direction of the work 4. Such rotation instruction and torque instruction can be realized by electric control.

Thus, the support arms 8 are orthogonal to the cutting line 6 in the section P2-P3 in plane view, whereby the wire support direction of the guide rollers 2 relative to the wire 3 is opposed to the cutting-feeding direction of the cutting line 6 in the section P2-P3. Here, the deflection angle α1 at the point P2 can be calculated from an equation, tan α1=(X-direction feed amount per unit time/Y-direction feed amount per unit time) using data about a feed amount per unit time, while the moving amount of the operation shaft 9 can be found as an arc length in the section a2-a3 from the deflection angle α1 and the arm length of the support arm 8.

Thus, the control device 11 moves the roller shafts 5 of the guide rollers 2 to a direction orthogonal to the cutting-feeding direction in plane view, namely, to a direction orthogonal to the cutting line 6 in section P2-P3, thereby opposing the wire support direction of the guide rollers 2 to the cutting-feeding direction perfectly or within a practically allowable range. Here, when it takes time to change the wire support direction of the guide rollers 2 at the point P2 in the cutting line 6, the control device 11 stops the cutting-feeding of the work 4 temporarily as required and starts it again after change of the wire support direction of the guide rollers 2.

Next, while the work 4 is being cut and, at the position of the point P3 of the cutting line 6, the cutting-feeding direction of the work 4 is changing, the control device 11 moves the operation shaft 9 along the section a4-a5 of an arc around the center axis 3a of the wire 3 in the cutting area and simultaneously rotates the support arms 8 counterclockwise about the operation shaft 9, whereby, while maintaining the contact between the guide rollers 2 and work 4, the wire support direction of the guide rollers 2 is opposed to the cutting-feeding direction of the work 4. Accordingly, the guide rollers 2, at the position of the point P3 of the cutting line 6, changes its direction counterclockwise by a deflection angle α2 and thereafter passes the wire 3 along the cutting line 6 in a section P3-P4 for cutting the work 4.

Figure 6:
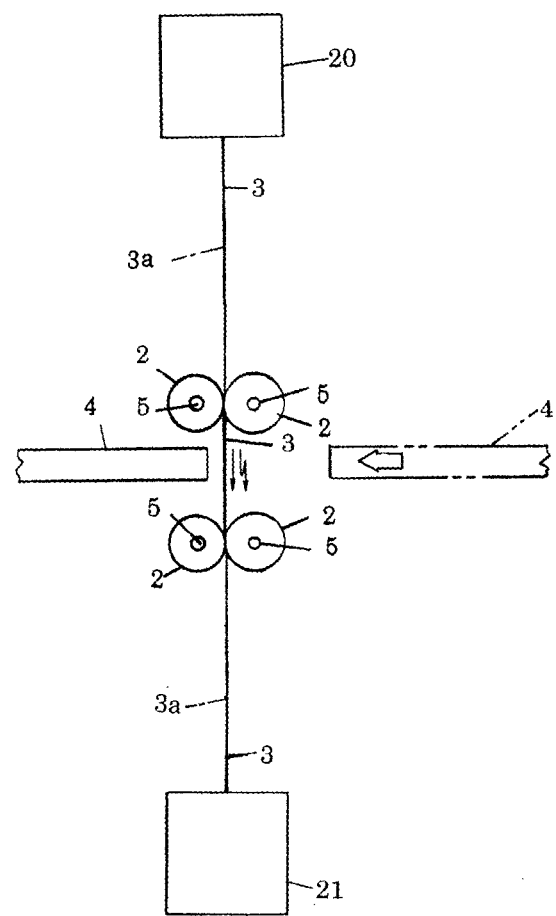
FIG. 6 is a side view of another wire path in the single-wire type wire saw of the invention.

FIG. 6 shows another mode for supporting the wire 3 by the guide rollers 2. According to the example shown in FIGS. 1 to 3, the cutting-feeding direction of the work 4 is limited to the direction of a large arrow of FIG. 3 because of the mode for supporting the wire 3 by the guide rollers 2. Meanwhile, as shown in FIG. 6, in the case that another grooved guide rollers 2 are disposed opposed to their respective grooved guide rollers 2 and are contacted externally with the wire 3, while the wire 3 is sandwiched and supported from two opposed directions, the cutting-feeding direction of the work 4 is not limited to the large arrow direction of FIG. 3 but may also be a direction opposed to this direction, that is, when the work 4 is fed in the large arrow direction of FIG. 6. This enables the wire to cut the work from the two directions at different cutting times. In the example of FIG. 6 as well, the wire feed-out device 20 and wire take-up device 21 are disposed on the extension of the linear wire 3.

The above description assumes that the linear-shaped wire 3 is interposed between the guide rollers 2, whereas it does not consider the deflection of the wire 3 in the cutting area. However, actually, while the work 4 is being cut, the wire 3 is always caused to deflect in the cutting area. When the wire 3 deflects in the cutting area between the guide rollers 2, the actual cutting position of the deflecting wire 3 retreats in the feeding direction from the ideal target cutting position of the linear wire 3 between the guide rollers 2, thereby causing the position to shift.

Figure 7:
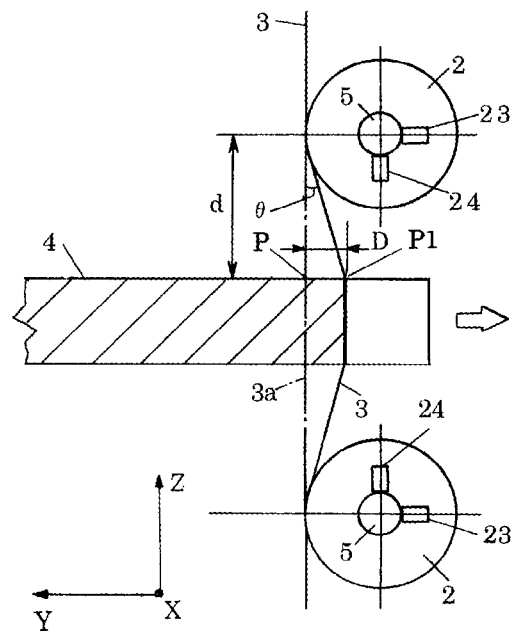
FIG. 7 is an explanatory view of deflection of a wire in the single-wire type wire saw of the invention.

FIG. 7 shows the relationship between the guide rollers 2 and the deflection of the wire 3, target cutting position P, actual cutting position P1 and distance from the actual cutting portion P1 to target cutting position P, namely, the retreat distance D of the wire 3 due to its deflection. In FIG. 7, when the wire 3 at the actual cutting position P1 at the position of one of the guide rollers 2 is assumed to have shifted due to its deflection by an angle θ at the external contact position with respect to the wire 3 at the target cutting position P, and the distance between the external contact position of the wire 3 with the guide roller 2 and the upper surface of the work 4 is expressed as d, the distance D can be obtained from an equation, $D = d \tan \theta$. This relationship holds also at the position of the other guide roller 2. The operator should have previously measured the distance d and, by operating the display-equipped input device 22, have previously input the data value of the distance d and the data value of the allowable range of the below-mentioned distance into the control device 19 D according to a cutting program.

Also, in FIG. 7, a sensor 23 is used to detect a component force Fy in the Y direction at the position of the roller shaft 5 with respect to the guide rollers 2, while a sensor 24 is used to detect a component force Fz in the Z direction at the position of the roller shaft 5 with respect to the guide rollers 2. These sensors 23 and 24 are, for example, distortion sensors.

Figure 8:
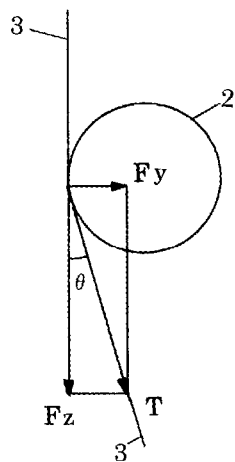
FIG. 8 is an explanatory view of the relationship between the tension of a wire and a component force in the single-wire type wire saw of the invention.

FIG. 8 shows the relationship between component forces to be applied to one guide roller 2 due to the tension T of the deflecting wire 3. In FIG. 8, supposing the Y-direction component force Fy and Z-direction component force Fz are applied to the roller shafts 5 due to the tension T of the deflecting wire 3, the angle θ of the above equation can be obtained from an equation, $\tan \theta = Fy/Fz$, where the Y-direction component force Fy acting on the roller shaft 5 of the guide roller 2 is detected by the sensor 23, the Z-direction component force Fz is detected by the sensor 24 and the outputs of the sensors 23 and 24 are used. Accordingly, the distance D can be obtained by calculation from the two equations.

The positioning control device 11, when coping with the deflection of the wire 3, fetches therein the data value of the distance d and the data value of the allowable range of the distance D previously input in the display-equipped input device 22 and, during cutting, inputs therein the output y of the sensor 23 and the output z of the sensor 24. The shift of the cutting position due to deflection of the wire 3 does not appear as a cutting error during cutting in a linear direction but, when the cutting direction changes, that is, when the cutting-feeding direction changes, appears as the error of the cutting position.

Thus, when the cutting direction changes while cutting the work 4 and the cutting-feeding direction of the work 4 changes, the control device 11 obtains the shift of the cutting position caused by deflection of the wire 3, that is, the distance D from the target cutting position P to the actual cutting position P1 from the above equation; and, when it determines that the distance D is so large as not allowable in cutting precision and thus is out of the allowable range, it drives the positioning part 13 or 14, or both continuously to advance the cutting of the work 4 in excess by the distance D, thereby enabling the actual cutting position P1 to coincide with the target cutting position P.

Accordingly, in the case that deflection of the wire 3 in the cutting area is unignorably large when the cutting direction changes while cutting the work 4, even if the cutting-feeding of the work 4 has reached the target cutting position P from viewpoint of control data, the actual cutting position P1 has retreated by the distance D from the target cutting position P. Therefore, the control device 11 cutting-feeds the work 4 in excess by the retreat distance D and continues to cut the work 4 over the retreat distance D, thereby causing the actual cutting position P1 to coincide with the target cutting position P.

Next, since the actual cutting position P1 is known from the distance D, the control device 11 drives the positioning part 13 or 14 to move the operation shaft 9 and support arms 8 in the cutting-feeding direction of the work 4 up to a position where deflection of the wire 3 disappears, whereby the wire 3 is stretched linearly by its own tension between the guide rollers 2. As the operation shaft 9 and support arms 8 move, the wire 3 absorbs its deflection by the wire tension to return to the target cutting position P. Here, instead of moving the operation shaft 9, deflection of the wire 3 can also be absorbed by moving the cutting-feeding table 16 reversely to the cutting-feeding direction.

After then, the control device 11 moves the operation shaft 9 along an arc around the center axis 3a of the wire 3 stretched linearly with no deflection between the guide rollers 2 and simultaneously rotates the support arms 8 around the operation shaft 9, thereby opposing the wire support direction of the guide rollers 2 to the cutting-feeding direction of the work 4. Such series of operations can cope with deflection of the wire 3.

The cutting-feeding is a relative movement between the wire 3 and work 4 and, thus, as in the illustrated example, instead of disposing the wire 3 at a specific position immovably and moving the work 4 in the cutting-feeding direction, it can also be realized by disposing the work 4 at a specific position immovably and moving the wire 3 and mechanical parts involved with support of the wire 3 in the cutting-feeding direction. Therefore, the cutting-feeding must be understood that it includes the cutting-feeding mode of the work 4 and also the cutting-feeding mode of the wire 3. However, as in the illustrated example, the cutting-feeding mode of the work 4 is simpler in mechanical structure than the cutting-feeding mode of the wire 3 and is thus more advantageous on enforcement.

Also, in the case that the cutting line 6 does not start at the outer peripheral surface of the work 4 but cutting is started in the intermediate of the work 4, a hole for insertion of the wire 3 is previously formed in the start point of the cutting line 6 and the wire 3 is inserted through the hole before cutting is started.

As described above, although the wire support direction of the guide rollers 2 or the direction of the guide rollers coincides with the cutting-feeding direction of the work 4, it may also be slightly shifted practically within an allowable range where practical troubles are prevented, for example, the wire 3 is prevented from shifted from the interior of the guide groove 7 and the wire 3 is prevented from meandering while traveling.

What is claimed is:

1. A method for cutting a work using a single-wire type wire saw wherein a pair of grooved guide rollers are rotatably contacted externally with a wire stretched with predetermined tension by respective roller shafts of the pair of grooved guide rollers with the same direction, a work is placed in a cutting area between the pair of grooved guide rollers, with a cutting-feeding direction previously set in a direction opposed to a wire support direction of the pair of grooved guide rollers, the work is fed in the cutting-feeding direction relatively to the wire to press a cutting position of the work against the wire, and the work is cut along a cutting line by traveling the wire, the cutting method comprising:

holding the wire at the cutting position of the work by supports arms and a movable operation shaft,
wherein the support arms connect to the roller shafts respectively and extend in a direction of the roller shafts, and
the movable operation shaft supports the support arms rotatably and a shaft of the operation shaft is parallel to a center axis of the wire,
moving the operation shaft along an arc around the center axis of the wire in the cutting area, when the cutting-feeding direction changes during a cutting of the work; and
rotating the support arms around the operation shaft simultaneously with the moving of the operation shaft to thereby oppose the wire support direction of the pair of grooved guide rollers to the cutting-feeding direction.

2. The work cutting method using a single-wire type wire saw according to claim 1,
wherein, during a changing of the cutting-feeding direction, when an actual cutting position is retreated from a target cutting position by a distance outside of an allowable range due to deflection of the wire in the cutting area, the cutting of the work is continued in excess by the distance to make the actual cutting position coincide with the target cutting position, whereby the wire support direction of the pair of grooved guide rollers is made opposed to the cutting-feeding direction.

3. The work cutting method using a single-wire type wire saw according to claim 1,
wherein the operation shaft includes a hold unit, and
during the cutting of the work, the wire is held at the cutting position of the work by a hold force of the hold unit.

4. The work cutting method using a single-wire type wire saw according to claim 1,
wherein the operation shaft is positioned in two mutually directions orthogonal to a position of the operation shaft, on a plane orthogonal to the operation shaft, to thereby move the operation shaft along the arc around the center axis of the wire.

5. A single-wire type wire saw wherein a pair of grooved guide rollers are rotatably contacted externally with a wire stretched with predetermined tension by respective roller shafts of the pair of grooved guide rollers with the same direction, a work is placed in a cutting area between the pair of grooved guide rollers, with a cutting-feeding direction previously set in a direction opposed to a wire support direction of the pair of grooved guide rollers, the work is fed in the cutting-feeding direction relatively to the wire to press a cutting position of the work against the wire, and the work is cut along a cutting line by traveling the wire, the wire saw comprising:

support arms that connect to the roller shafts respectively and that extend in a direction of the roller shafts;
a movable operation shaft that supports the support arms rotatably, a shaft of the operation shaft being parallel to a center axis of the wire;
a hold unit that holds the wire at the cutting position of the work;
a positioning drive device that positions the operation shaft in two mutually directions orthogonal to a position of the operation shaft, on a plane orthogonal to the operation shaft; and,
a positioning control device that drives the positioning drive device in the two mutually orthogonal directions according to data of the cutting line of the work to thereby move the operation shaft,
wherein, when the cutting-feeding direction changes during a cutting of the work, the operation shaft is moved along an arc around the center axis of the wire in the cutting area by the positioning control device and the positioning drive device, and simultaneously the support arms are rotated around the operation shaft by the positioning control device and the hold unit to thereby oppose the wire support direction of the pair of grooved guide rollers oppose to the cutting-feeding direction.

6. The single-wire type wire saw according to claim 5,
wherein, during a changing of the cutting-feeding direction, when the positioning control device determines that an actual cutting position is retreated from a target cutting position by a distance outside of an allowable range due to deflection of the wire in the cutting area, the cutting of the work is continued in excess by the distance to make the actual cutting position coincide with the target cutting position, whereby the wire support direction of the pair of grooved guide rollers is made opposed to the cutting-feeding direction.

7. The single-wire type wire saw according to claim 5,
wherein the operation shaft includes the hold unit, and
during the cutting of the work, the wire is held at the cutting position of the work by a hold force of the hold unit.

8. The single-wire type wire saw according to claim 5,
wherein the hold unit includes a torque motor or a servo motor.

9. The single-wire type wire saw according to claim 5,
wherein the wire is disposed at a predetermined position and the work is moved in the cutting-feeding direction.

10. The single-wire type wire saw according to claim 5,
wherein the work is fixed on a cutting-feeding table, and the cutting-feeding table is cutting-fed in two orthogonal directions by two cutting-feeding units according to data of the cutting line of the work.

11. The single-wire type wire saw according to claim 5,
wherein another pair of grooved guide rollers are disposed opposed to the pair of grooved guide rollers, and
both of the pair of guide rollers are contacted externally with the wire to thereby support the wire in two directions.

* * * * *